Oct. 11, 1932. J. H. FREEZE 1,882,136
GATE VALVE
Filed June 11, 1929
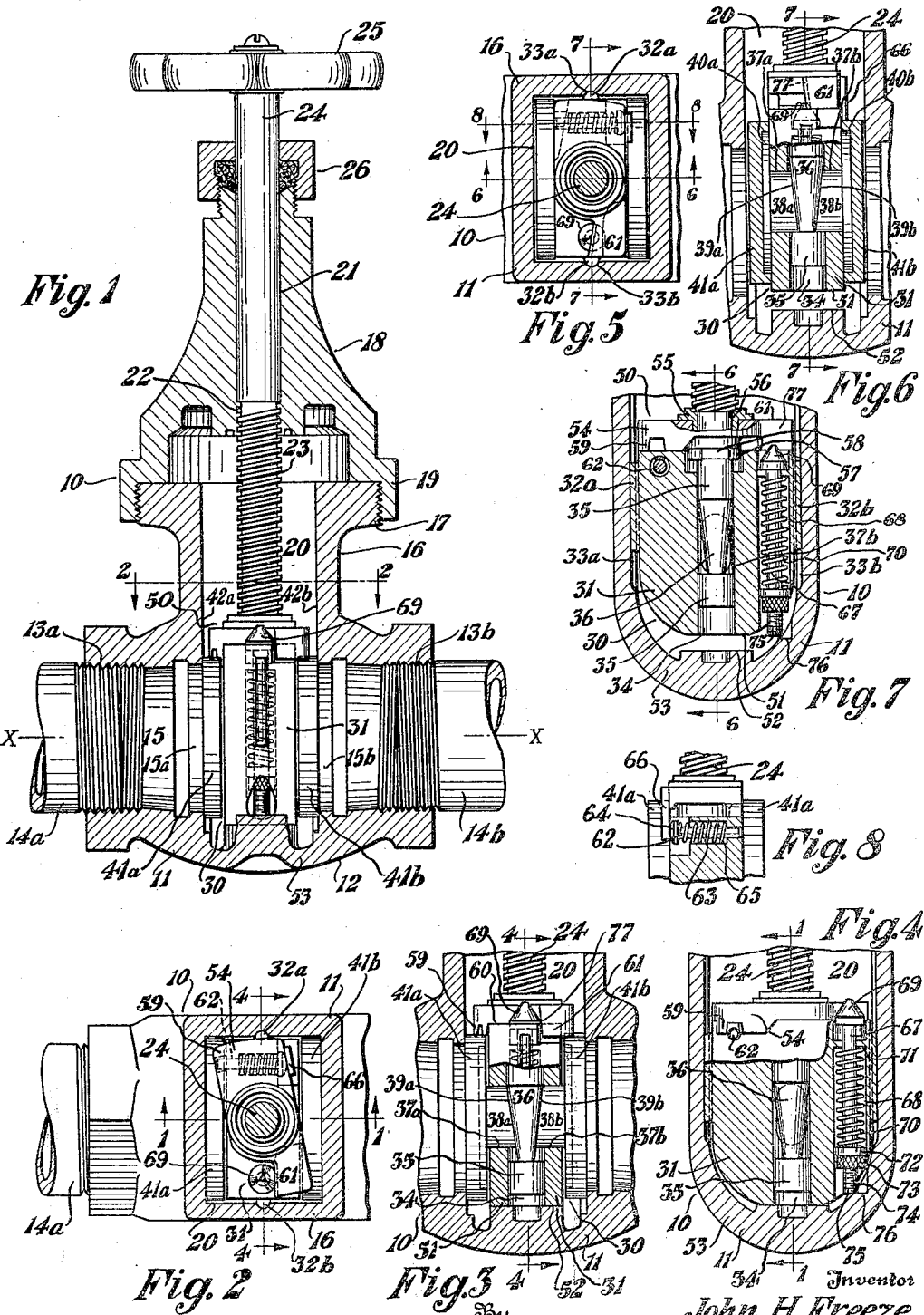
Inventor
John H. Freeze
By Harry Freese
Attorney Patented Oct. 11, 1932

1,882,136

UNITED STATES PATENT OFFICE

JOHN H. FREEZE, OF CANTON, OHIO

GATE VALVE

Application filed June 11, 1929. Serial No. 370,040.

My invention relates to gate valves and more particularly to gate valves adapted for use in high pressure pipe lines.

The usual types of gate valves tend to stick and bind in operation, require great effort to open and close the valve gates, and tend to leak particularly at the joint between the bonnet and the valve casing.

The objects of the present improvements include the provision of a gate valve particularly adpated for use in high pressure lines, which will not stick or bind in use, which requires very little effort for opening and closing the valve gates, and which does not tend to leak under high pressures.

These and other objects are attained in the present invention, as will hereinafter be set forth in detail and claimed.

A preferred embodiment of the invention is illustrated in the accompanying drawing forming part hereof, in which Figure 1 is a vertical longitudinal sectional view as on lines 1—1, Figs. 2 and 4 of one of the improved valves incorporated in a pipe line, the valve gates being illustrated in the seated or closed position;

Fig. 2, a horizontal fragmentary sectional view thereof as on line 2—2, Fig. 1;

Fig. 3, a fragmentary view similar to Fig. 1, with portions of the valve gate carrier block also being illustrated in section;

Fig. 4, a fragmentary transverse sectional view as on lines 4—4, Figs. 2 and 3;

Fig. 5, a view similar to Fig. 2 with the valve gates illustrated in the unseated or open position;

Fig. 6, a fragmentary longitudinal sectional view thereof as on lines 6—6, Figs. 5 and 7;

Fig. 7, a fragmentary transverse sectional view thereof as on lines 7—7, Figs. 5 and 6; and Fig. 8, a fragmentary sectional view thereof as on line 8—8, Fig. 5.

Similar numerals refer to similar parts throughout the several views.

The improved gate valve is indicated generally at 10, and includes a body casing 11, which may be in the form of a T as illustrated, and the ends of the head 12 of the T casing may be provided in a usual manner with internally threaded ports 13a and 13b, respectively, preferably coaxial with each other. The threaded end of a pipe 14a is screwed in the port 13a, and the threaded end of a pipe 14b is screwed in the port 13b, in the usual manner, one of the ports being an inlet port for the valve flow chamber 15 formed within the casing, and the other port being an outlet port therefor, and the pipes 14a and 14b being sections of any desired pipe line, which may be a pipe line conveying fluid at high pressure.

The stem 16 of the T casing includes an outer end 17, which is externally threaded, contrary to the usual practice of internally threading the bonnet connection of a valve casing, and a bonnet 18 is provided with an internally threaded connecting end 19 which is screwed upon the externally threaded casing end 17.

The T casing stem 16 has formed therein a gate chamber 20 whose longitudinal axis is preferably at right angles to the axis of the pipes 14a and 14b, and the gate chamber extends from the outer extremity of the casing stem to an intersection and communication with the flow chamber 15.

As best illustrated in Fig. 5, the gate chamber 20 is preferably rectangular in cross section for reasons which will hereinafter appear.

The bonnet 18 includes a valve stem bore 21, a portion of which is internally threaded as at 22, for engagement with the threads 23 formed on the central portion of the valve stem 24, which is thus arranged to be translated through the bore 21 in the usual manner by rotation of the stem.

The outer end of the smooth portion of the valve stem extends outside of the bonnet in the usual manner, and is provided at its extremity with a hand wheel 25 for rotating the stem. A packing box indicated generally at 26 is also provided about the valve stem at the outer end of the bonnet.

The inner end of the valve stem 24 is operatively connected, in a novel manner which will hereinafter be set forth in detail, to a novel valve gate mechanism indicated generally at 30.

The gate mechanism 30 preferably includes a mounting and connecting member 31, from opposite sides of which preferably extend guide lugs 32a and 32b which slide in opposite parallel guide grooves 33a and 33b, formed in the inner opposite side surfaces of the gate chamber 20 parallel with the longitudinal axis of the valve stem.

The mounting member 31 has formed therein a valve stem guideway 34, preferably having a closed circular cross section for slidably receiving preferably round portions 35 of the inner end of the valve stem.

The inner end of the valve stem has also formed thereon, preferably between the round portions, a conically tapered wedge block actuating portion 36, the small end of which is nearest the inner extremity of the valve stem.

At right angles to the valve stem guideway 34, the mounting member 31 has formed therein wedge block guideways 37a and 37b, which communicate with and extend from opposite sides of the valve stem guideway, and which are preferably coaxial with each other and parallel with the flow axis X—X of the flow chamber 15, which is itself preferably circular in cross section and coaxial with the pipes 14a and 14b.

As best illustrated in Fig. 7, the wedge block guideways are preferably of a cross section having unequal dimensions at right angles with each other.

A wedge block 38a slidably fits in the guideway 37a for translation in the direction of the axis X—X of the flow chamber, and similarly a wedge block 38b slidably fits in the guideway 37b for translation in the direction of the axis X—X of the flow chamber.

The wedge blocks 38a and 38b are provided with inner bevel wedge ends 39a and 39b, the slopes of which are equal to the slope of the tapered portion 36 of the valve stem, whereby when the wedge blocks are pushed towards each other, their wedge ends will abut against the tapered portion of the valve stem, and any translatory movement of the valve stem in the guideway 34 will cause a translatory movement of the wedge blocks at right angles to the valve stem movement.

As illustrated, movement of the valve stem towards the axis X—X, displaces the wedge blocks with respect to each other, whereas movement of the stem in the opposite direction, assuming that pressure is applied to the opposite outer ends of the wedge blocks, will cause movement of the blocks towards each other.

The outer ends of the wedge blocks extend beyond the opposite end faces of the mounting member, and are preferably provided with the enlarged circular heads 40a and 40b, respectively, which fit into circular sockets formed in the outer faces of gate disks 41a and 41b.

The opposite end faces 42a and 42b of the gate chamber 20, are preferably finished at least adjacent the intersection thereof with the flow chamber 15 for providing a seat against which the outer faces of the gate disks 41a and 41b may be abutted for closing the communication between opposite ends of the flow chamber when the valve stem is moved towards the axis X—X.

As indicated, the gate disks are larger in diameter than the diameter of the flow chamber 15, and may thus fit over the opposite inner ends of the portions 15a and 15b of the flow chamber at opposite sides of the valve stem, provided that the mounting member has been moved so that the disks are coaxial with the flow chamber.

The round portion 35 of the valve stem at the extremity thereof forms a hook head for engagement with the adjacent sides of the wedge blocks, whereby movement of the valve stem away from the axis X—X caused by suitable rotation of the hand wheel 25, will first release the wedging engagement of the tapered portion 36 of the valve stem against the opposite ends of the wedge blocks, whereby the pressure in the pipe line working against the opposite faces of the gate disks, releases the same from their closing engagement over the opposite ends of the flow chamber portions 15a and 15b.

Further movement of the valve stem causes the whole gate mechanism to be bodily moved from its position in the flow chamber, into the gate chamber, permitting any desired degree of flow through the flow chamber.

The gate mechanism 30 is further provided with automatic latch and stop means, indicated generally at 50, for maintaining the mounting member, which is slidable as aforesaid on the cylindrical portions 35 of the inner end of the valve stem, in its extreme position of displacement thereon away from the bonnet 18, except when the inner end 51 of the mounting member has been abutted against the outer end of a seat 52 formed within the casing 11 and extending from the inner surface of the casing closure portion 53 for the end of the gate chamber.

The latch and stop means includes a rotary latch and stop bar 54, which is preferably rotatably mounted on the valve stem between the mounting member 31 and the threaded central portion of the valve stem. The rotary latch bar 54 is preferably rotatably mounted on a sleeve and thrust bearing 55, and the inner end of the valve stem is preferably reduced in diameter with respect to the threaded portion, so that a shoulder 56 is formed between the threaded portion and the inner end of the valve stem, which extends through the sleeve and thrust bearing 55 carrying the rotary latch bar 54, so that the shoulder 56 abuts against the adjacent end of the bearing 55.

The bearing 55 with its rotary latch arm is preferably removably secured in a fixed translatory position on the valve stem, as by means of a U collar 57 which is seated in a neck groove 58 formed in the inner end of the valve stem, and the U collar 57 provides a stop for the end of the bearing 55 adjacent the inner extremity of the valve stem.

At one side of the valve stem, a latch foot 59 extends towards the mounting member from one outer corner of the face 60 of the latch bar adjacent the mounting member 31; and at the other side of the valve stem, preferably from the outer corner at the opposite side of the latch bar, a similar latch foot 61 extends towards the mounting member.

Accordingly when the latch bar is rotated to the position illustrated in Figs. 5, 6, and 7, which is the normal position of the latch bar except during closure of the valve, the ends of the latch feet 59 and 61 ride upon the adjacent end of the mounting member, thereby maintaining the mounting member in its extreme position of displacement on the valve stem away from the bonnet 18, with the tapered wedge block actuating portion 36 of the valve stem being in the relative position with respect to the mounting member illustrated in Fig. 6, whereby the wedge blocks are permitted to move towards each other and the gate disks are permitted to move towards each other to valve opening position, by the action of the pipe line pressure against the opposite gate disks.

Thus maintaining the mounting member in its extreme position of displacement with respect to the hand wheel 25, permits the mounting member to be moved to its proper position against the seat 52 before any closure movement of the valve disks can take place, thereby assuring the proper axial alinement of the valve disks with their seats at the intersections of the flow chamber with the gate chamber.

At one side of the valve stem, means are provided for applying a force tending to move the latch bar into stop engagement with the mounting member, and preferably include a plunger 62 which is slidably mounted in a bore 63 formed in the mounting member, and the axis of the plunger being transverse to the axis of the valve stem.

The outer end of the plunger is provided with a head 64 and a compression spring 65 is interposed between the head and a suitable shoulder formed in the bore 63 for normally pushing the plunger head away from the mounting member in a clockwise direction when viewed as in Fig. 2. The head of the plunger abuts against a tongue 66 extending from one side of the latch bar 54 towards the mounting member.

The spring pressed plunger 62 thus always applies a torque to the latch bar, tending to rotate the latch bar to the position illustrated in Figs. 5, 6, and 7, where the latch feet are in stop engagement with the adjacent end of the mounting member.

At the other side of the valve stem, automatically actuated latch releasing means are provided for automatically rotating the latch bar in the counter-clockwise direction as viewed in Fig. 2, after the mounting member has been abutted against its seat 52, thus releasing the stop engagement of the latch feet with the mounting member; and the latch releasing means preferably include a slide rod 67 preferably parallel with the valve stem, and operatively mounted in a suitable bore 68 formed in the mounting member.

The end of the slide rod 67 adjacent the latch bar extends from the mounting member and is provided with a preferably conical cam head 69. A compression spring 70 is located within the bore 68 and acts between a shoulder 71 extending inwardly from the surface of the bore, and a collar 72 which is preferably longitudinally adjustably mounted on the slide rod 67, as by means of a nut 73 screwed on a threaded portion 74 of the slide rod.

The slide rod extends entirely through the mounting member, and its extremity 75 opposite the head 69 is arranged to be abutted against a seat 76 formed in the inner surface of the casing portion 53, for moving the slide rod towards the bonnet against the action of the spring 70.

The foot 61 is provided with an angled side face 77 adjacent the cam head 69, whereby movement of the cam head 69 towards the bonnet against the side face 77, rotates the latch bar in a counter-clockwise direction as viewed in Fig. 2, so that the latch feet are swung out of engagement with the mounting member, thereby permitting translatory movement of the inner end of the valve stem within the mounting member, thus causing the wedge blocks to be moved away from each other as aforesaid to seat the gate disk in valve closing position as ilustrated in Figs. 1, 2, 3, and 4.

The improved gate valve thus set forth in detail, is very easy to operate, even in pipe lines transporting liquids containing grit, sludge and the like.

In the operation of the valve, assuming the gate mechanism 30 to be in open position as shown in Fig. 6 with the latch feet 59 and 61 abutting the top face of the mounting member 31, the valve is closed by screwing down on the handle 25. As the gate mechanism is lowered, due to pressure exerted by the shoulder 56 of the screw 24 against the bearing 55, the extremity 75 of the latch releasing slide rod 67 engages the seat 76 forcing the cam head 69 upwardly relative to the downward movement of the gate mechanism.

The cam head 69 engages the side face 77 of the latch bar 54 rotating it in a counter-clockwise direction to the position shown in Figs. 1 and 2. In this position the latch feet have moved out of engagement with and over the adjacent edges of the top face of the mounting member. At this time the inner end 51 of the mounting member abuts against the seat 52 of the valve casing. Further rotation of the screw causes the valve stem 35 to move downward through the mounting member, carrying the latch feet 59 and 61 below the top surface of the mounting member and the wedge portion 36 of the valve stem forces the wedge blocks 38a and 38b outwardly and the disks 41a and 41b into seating engagement with the end faces 42a and 42b of the gate chamber, thereby completely closing the valve.

During the interval between the seating of the mounting member, and before the gate disks are seated in closing position, the fluid pressure in the pipe line serves to swirl against the gate disks and their seats on the opposite ends of the flow chamber portions 15a and 15b, cleaning the same from any grit, or sludge which may have become lodged thereon.

Then the wedge blocks move the gate disks away from each other, and tightly closing the valve, with very little manual exertion on the handle 25.

In opening the valve, the handle is oppositely rotated and the pressure in the line acting against the valve disk 41a and 41b holds the mounting member against movement while the valve stem is raised until the movement of the wedge portion 36 permits the pressure in the line to move the disks 41a and 41b inwardly. The valve stem moves upwardly until the round portion 35 thereof engages the wedge blocks 38a and 38b, as best shown in Fig. 6, during which time the latch feet of the latch bar 54 are raised a sufficient distance to clear the top surface of the mounting member. Further rotation of the screw causes the whole gate mechanism to move upwardly due to engagement of the portion 35 of the stem with the wedge blocks, thus moving the end 75 of the member 67 out of abutment with the seat 76 and allowing the cam head 69 to return to its original position shown in Fig. 7, when the plunger 62 will rotate the latch bar 54 in a clockwise direction until the face 77 strikes the tip of the cam head and the latch bar is in a position shown in Figs. 5, 6, 7 and 8.

As aforesaid opening of the valve is very easy because very slight movement of the valve stem away from the axis X—X permits the pressure of the pipe line to push against the gate disks, and the pipe line pressure thus facilitates the opening of the valve, instead of making it more difficult, as is the case in other types of gate valves.

I claim:

1. A gate valve including a body casing, walls of the casing forming a flow chamber and a gate chamber intersecting the flow chamber, a valve stem movable in the gate chamber towards and away from the flow axis of the flow chamber, a mounting member carried by the valve stem within the gate chamber and movable longitudinally of the valve stem, gate means carried on the mounting member and movable towards and away from the valve stem, means operable by movement of the valve stem in the mounting member for moving the gate means away from the valve stem for closing an adjacent end of a flow chamber portion, a latch rotatably mounted on the valve stem for normally holding the mounting member against movement on the valve stem, and means actuated by bodily movement of the valve stem and mounting member for rotating the latch to permit movement of the valve stem in the mounting member.

2. A gate valve including a body casing, walls of the casing forming a flow chamber and a gate chamber intersecting the flow chamber, a valve stem movable in the gate chamber towards and away from the flow axis of the flow chamber, a mounting member carried by the valve stem within the gate chamber and movable longitudinally of the valve stem, gate members carried on the mounting member at opposite sides of the valve stem and movable towards and away from the valve stem, means operable by movement of the valve stem in the mounting member for moving the gate members away from the valve stem for closing opposite ends of flow chamber portions, a latch rotatably mounted on the valve stem for normally holding the mounting member against movement on the valve stem, and means actuated by bodily movement of the valve stem and mounting member for rotating the latch to permit movement of the valve stem in the mounting member.

3. A gate valve including a body casing, walls of the casing forming a flow chamber and a gate chamber intersecting the flow chamber, a valve stem movable in the gate chamber towards and away from the flow axis of the flow chamber, a mounting member carried by the valve stem within the gate chamber and movable longitudinally of the valve stem, gate means carried on the mounting member and movable towards and away from the valve stem, means operable by movement of the stem in the mounting member for moving the gate means away from the valve stem for closing an adjacent end of a flow chamber portion, a latch rotatably mounted on the valve stem for normally holding the mounting member against movement on the valve stem, means actuated by bodily movement of the valve stem and mounting member for rotating the latch to permit movement of the valve stem in the mounting member, and means urging the latch to the position for holding the mounting member against movement on the valve stem.

4. A gate valve including a body casing, walls of the casing forming a flow chamber and a gate chamber intersecting the flow chamber, a valve stem movable in the gate chamber towards and away from the flow axis of the flow chamber, a mounting member carried by the valve stem within the gate chamber and movable longitudinally of the valve stem, gate members carried on the mounting member at opposite sides of the valve stem and movable towards and away from the valve stem, means operable by movement of the valve stem in the mounting member for moving the gate members away from the valve stem for closing opposite ends of flow chamber portions, a latch rotatably mounted on the valve stem for normally holding the mounting member against movement on the valve stem, means actuated by bodily movement of the valve stem and mounting member for rotating the latch to permit movement of the valve stem in the mounting member, and means urging the latch to the position for holding the mounting member against movement on the valve stem.

5. A gate valve including a body casing, walls of the casing forming a flow chamber and a gate chamber intersecting the flow chamber, a valve stem movable in the gate chamber towards and away from the flow axis of the flow chamber, a mounting member carried by the valve stem within the gate chamber and movable longitudinally of the valve stem, gate means carried on the mounting member and movable towards and away from the valve stem, wedge means operable by movement of the valve stem in the mounting member for moving the gate member away from the valve stem for closing an adjacent end of a flow chamber portion, a latch rotatably mounted on the valve stem and located above the mounting member for normally holding the mounting member against movement on the valve stem, means actuated by bodily movement of the valve stem and mounting member for rotating the latch to permit movement of the valve stem in the mounting member, and means normally urging the latch to the position for holding the mounting member against movement on the valve stem.

6. A gate valve including a body casing, walls of the casing forming a flow chamber and a gate chamber intersecting the flow chamber, a valve stem movable in the gate chamber towards and away from the flow axis of the flow chamber, a mounting member carried by the valve stem within the gate chamber and movable longitudinally of the valve stem, gate members carried on the mounting member at opposite sides of the valve stem and movable towards and away from the valve stem, wedge means operable by movement of the valve stem in the mounting member for moving the gate members away from the valve stem for closing opposite ends of flow chamber portions, a latch rotatably mounted on the valve stem and located above and mounting member for normally holding the mounting member against movement on the valve stem, means actuated by bodily movement of the valve stem and mounting member for rotating the latch to permit movement of the valve stem in the mounting member, and means normally urging the latch to the position for holding the mounting member against movement on the valve stem.

In testimony that I claim the above, I have hereunto subscribed my name.

JOHN H. FREEZE.